Feb. 26, 1957  E. P. JASPER  2,782,774
VERSATILE INTERNAL COMBUSTION ENGINES
Filed Sept. 1, 1953  7 Sheets-Sheet 1

INVENTOR.
Elmer P. Jasper
BY F. T. Hicks
His Attorney

Feb. 26, 1957 — E. P. JASPER — 2,782,774
VERSATILE INTERNAL COMBUSTION ENGINES
Filed Sept. 1, 1953 — 7 Sheets-Sheet 6

INVENTOR.
Elmer P. Jasper
BY F. O. Hicks
His Attorney

United States Patent Office 2,782,774
Patented Feb. 26, 1957

2,782,774
VERSATILE INTERNAL COMBUSTION ENGINES
Elmer P. Jasper, Algonac, Mich.

Application September 1, 1953, Serial No. 377,893

2 Claims. (Cl. 123—41.65)

The invention relates to air-cooled internal combustion engines and more particularly to small, portable, air-cooled internal combustion engines, made to be readily adaptable for a wide variety of different installations for driving various small household and shop machines, such as lawn mowers, pumps, washing machines, wood and metal working tools for home and shop use, just to mention a few different installations by way of example.

It is an object of the invention to provide a small portable air-cooled internal combustion engine of a rugged reliable construction comprising a small number of parts which are convenient to be assembled in arrangements to suit various different installations.

It is also an object of the invention to provide such an adaptable internal combustion engine having a crank shaft which can be reversed end-for-end in the crankcase so that the power take-off may be exposed for connection in either one of two different opposite directions.

It is a further object of the invention to provide such an adaptable internal combustion engine having the crank shaft combined with an adaptable power take-off coupler for convenience in coupling the engine with various different power utilizing devices.

A further object of the invention is to provide such convenient adaptability in an air-cooled engine of the two-stroke cycle type utilizing crankcase compression for charging the combustion space, in order to make such useful characteristics available in a small, portable engine, embodying a small number of parts in a simple assembly which may be readily assembled and installed by persons of average mechanical aptitude.

Further objects and advantages are within the scope of the invention, such as relate to the arrangement, operation and function of the related elements of the structure, to various details of construction and to combinations of parts, elements per se, and to economies of manufacture and numerous other features, as will be apparent from a consideration of the specification in conjunction with the drawings disclosing specific embodiments of the invention, wherein similar reference characters are applied to corresponding parts throughout, and in which:

Figure 1:
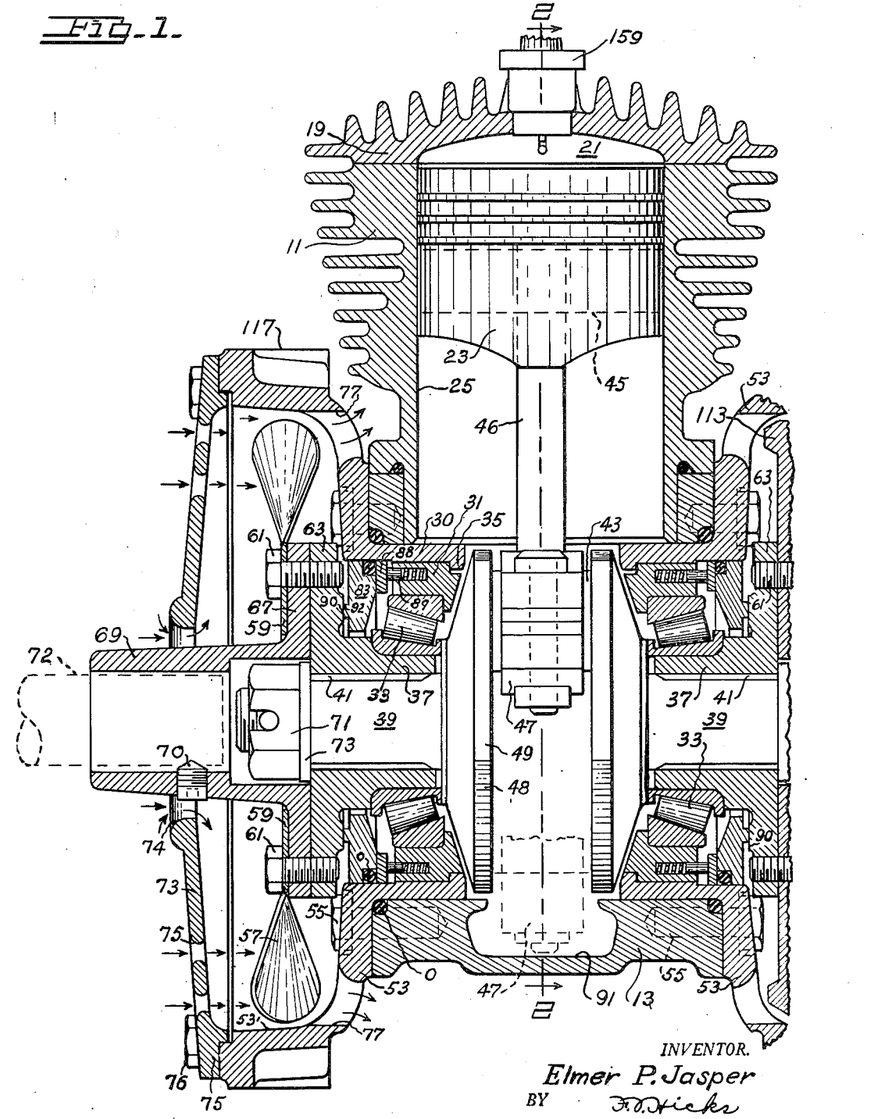
Fig. 1 is a sectional view taken along the axes of the cylinder and the crank shaft of the versatile internal combustion engine, and partially broken away.
Figure 2:
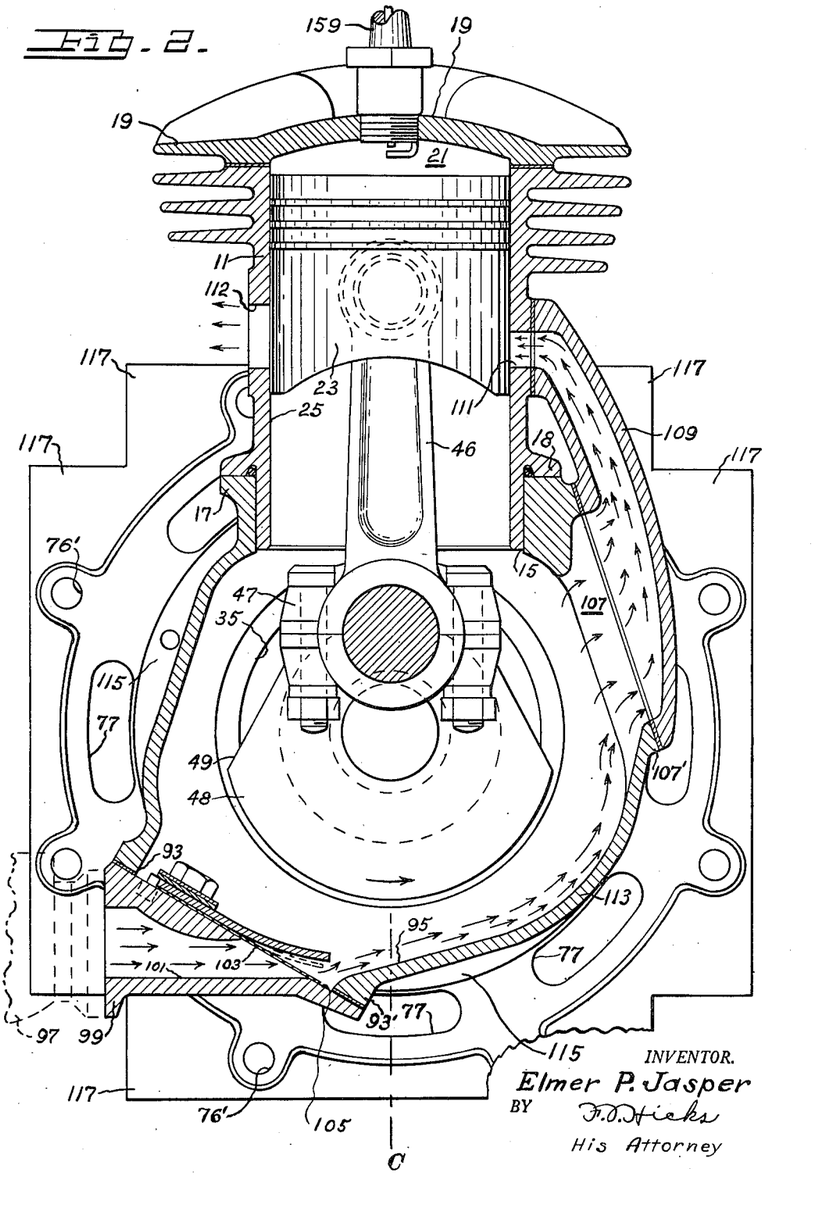
Fig. 2 is a sectional view on line 2—2 of Fig. 1.
Figure 3:
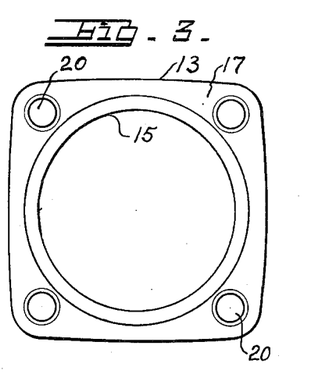
Fig. 3 is a plan view of the crankcase; to a reduced scale.
Figure 4:
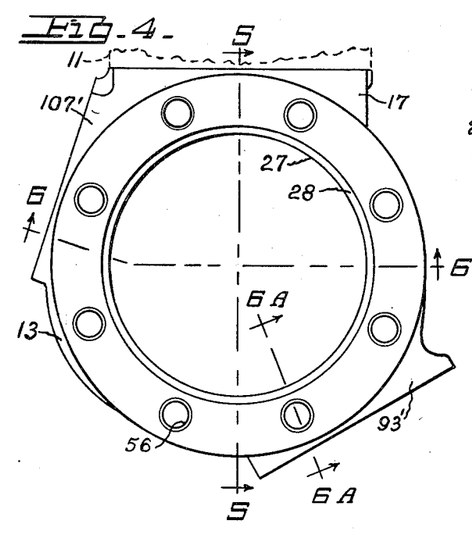
Fig. 4 is an end elevational view on a reduced scale showing the end of the crankcase, looking toward the right-hand side in Fig. 1, and with dotted lines representing the attached end of a cylinder.

Referring more particularly to Figs. 1 and 2 of the drawings it will be seen that my versatile internal combustion engine has a cylinder 11, which may be air cooled, having its inner end mounted upon a crackcase 13. The crankcase has a cylinder receiving aperture 15 which is encircled by a heavy mounting flange 17. The inner end of the cylinder is reduced to fit down into the crankcase cylinder aperture 15 and it has a lateral mounting flange 18, shaped to fit over the crankcase flange 17, seen in Fig. 3, the two being secured together snugly by studs 20 in a well known manner. The outer end of the cylinder 11 is closed by end wall means 19, which may be either integral or a separate head, to provide combustion space 21 in cooperative relation to a piston 23 sliding in a bore 25 of the cylinder, in a conventional power sealed relation.

Opening in aligned relation from opposite sides of the crankcase are large housing support apertures 27, with sealing grooves 28, the details of which are more clearly shown in Figs. 3 through 6. The adjacent walls of the crankcase 13 are thick and heavy for receiving and rigidly supporting annular housing collars or flanges 30 which carry bearing retainer rings 31 as a snug, oil tight, slip fit therein. Each of the bearing rings 31 may be provided with a friction reducing bearing, such as a taper roller bearing 33 of conventional construction. The outer race ring thereof is a snug fit in the bearing ring 31 which has an inner shoulder 35 limiting inward movement of the race ring. The inner race ring of each roller bearing encircles and rotatively carries the inner end of a bearing sleeve 37 having a central axial bore 38 and one of these bearing sleeves is secured upon each opposite end of a crank shaft 39, as by splines 41 between the shaft and the sleeves. This crank shaft is made symmetrical for reversible installation to take off power on either side and to run the engine in either direction. The crank pin 43 of the crank shaft is operatively connected with a wrist pin 45 in the piston by a conventional connecting rod 46 having crank pin bearing 47 so that reciprocatory movement of the piston in the cylinder causes rotation of the crank shaft in a conventional manner. The crank pin 43 is supported in the crank shaft between crank arms 48 at a suitable radius to provide the desired stroke of the piston. The crank arms 48 are provided with smooth tapering outward surfaces exposed adjacent to the bearing supporting structures at both ends of the crank shaft, and have flats 49 converging toward the crank pin.

Figures 11, 12, 13:
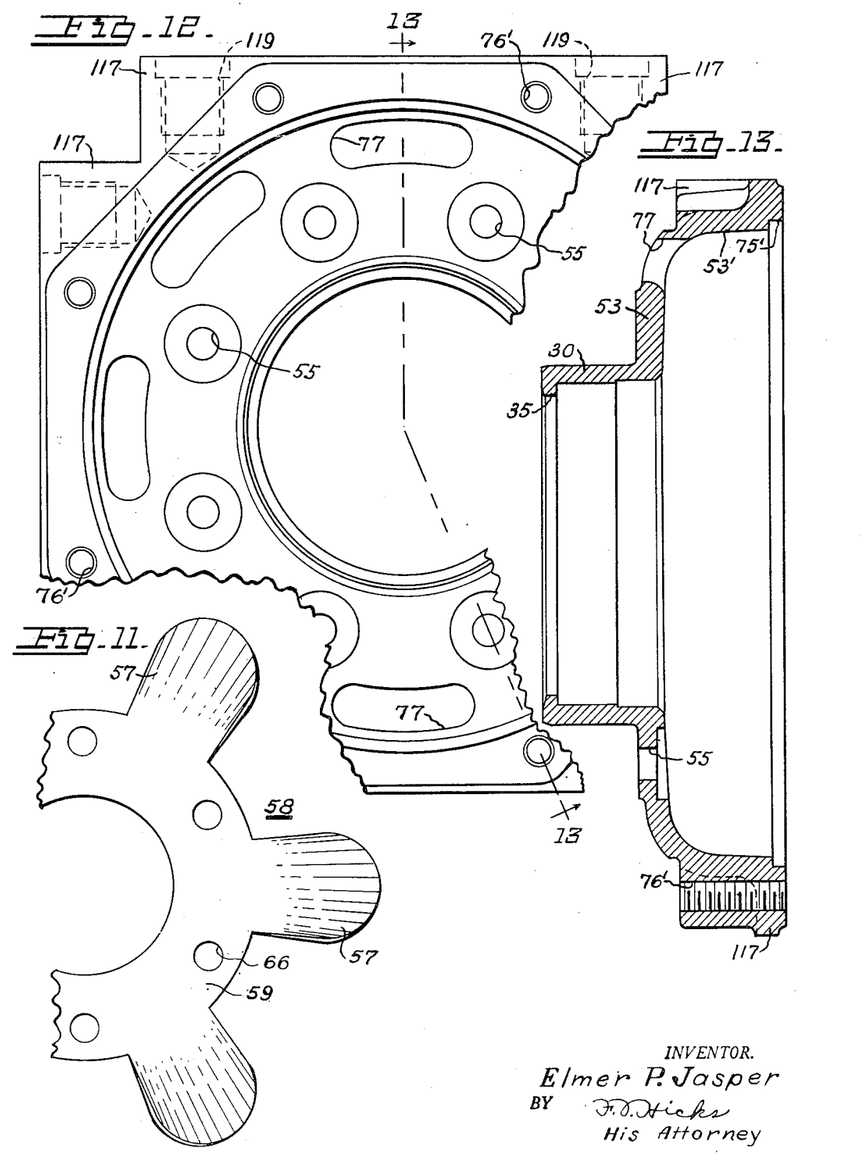
Fig. 11 is a plan view showing the fan stamping.
Fig. 12 is an outer end elevational view of an end housing.
Fig. 13 is a sectional view on line 13—13 in Fig. 12.
Figures 14, 15:
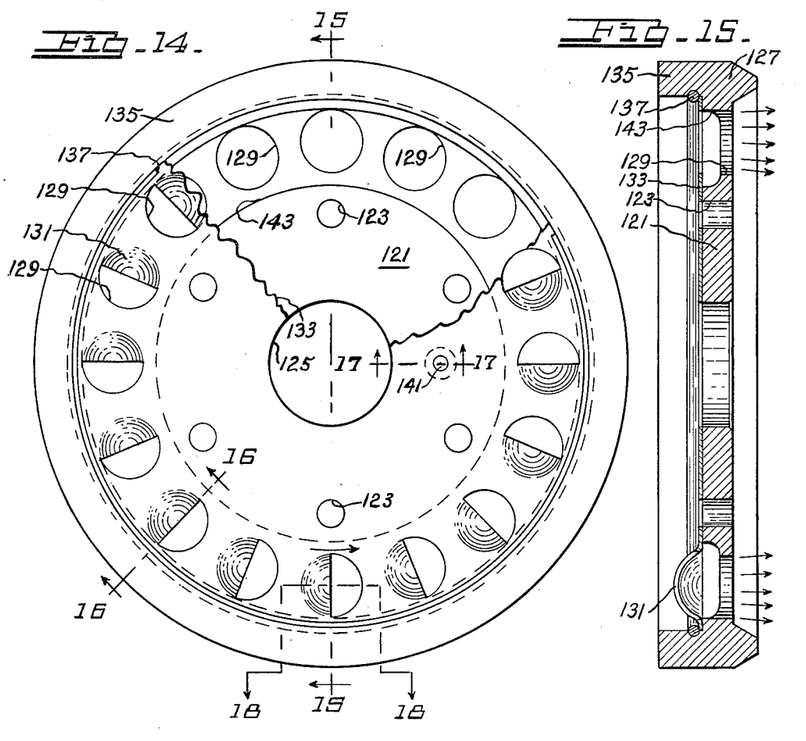
Fig. 14 is a side elevational view showing a combined fan flywheel, the scoop member being broken away in part.
Fig. 15 is a sectional view on line 15—15 in Fig. 14.
Figure 16:
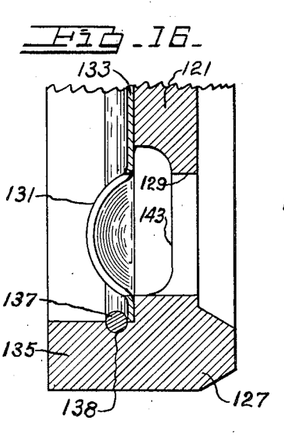
Figs. 16, 17 and 18 are enlarged fragmentary sectional views on the corresponding section lines in Fig. 14.
Figures 17, 18:
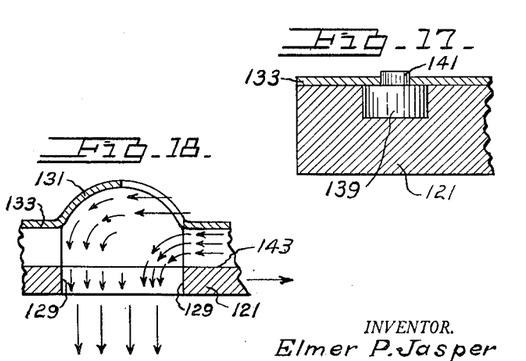

The annular housing flanges or necks 30 each extend axially inward from one end of an end housing 53. Each end housing 53 has a larger, somewhat bell-shaped, portion extending radially outward to a larger diameter and also projecting axially outward from the crankcase. The housing 53 is shown in greater detail in Figs. 12 and 13. The flange ring or neck 30 of each housing internally receives and holds one of the bearing rings 31. The outer surface of this housing neck 30 fits into the adjacent aperture 27 in the crankcase, being sealed around the base of the neck by yieldable material O in the annular groove 28 in crankcase and the housing 53 is firmly secured to the crankcase by screws 55 passed through apertures 55' in the outwardly flaring part of the end housing and extending threadably into threaded apertures 56 in the heavy reinforcing ring 29 of the crankcase. In Fig. 1 two of these screws 55 may be seen. A plurality of the threaded apertures 55' in the housing are shown in Fig. 18, and a plurality of such threaded apertures 56 provided in suitable circumferentially spaced positions in the crankcase, may be seen in Fig. 4. The end housing continues outwardly from the attachment screws 55 and it is formed to a generally cylindrical outer wall 53' enclosing the tips of the fan blades 57 of a fan 58. The fan 58 may be provided as an integral stamping, as shown in Fig. 11, the blades 57 thereof being integral with an inner mounting ring 59 for convenient and compact assembly and attachment.

Figure 7:
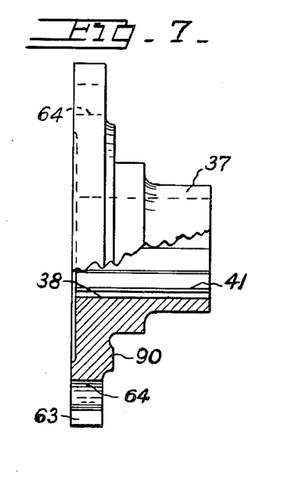
Fig. 7 is a side elevational view showing the bearing sleeve removed from the crank shaft.
Figure 8:
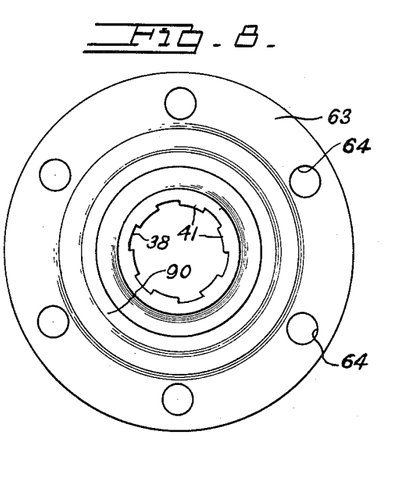
Fig. 8 is an end elevational view of the inner end thereof.
Figure 9:
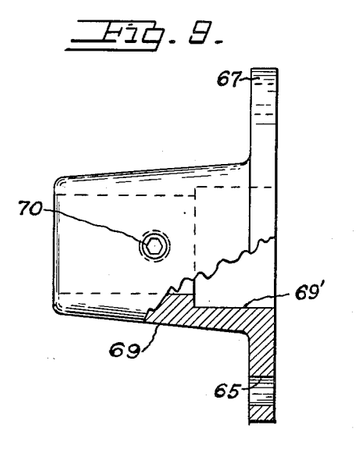
Fig. 9 is a side elevation of the power take-off coupler.
Figure 10:
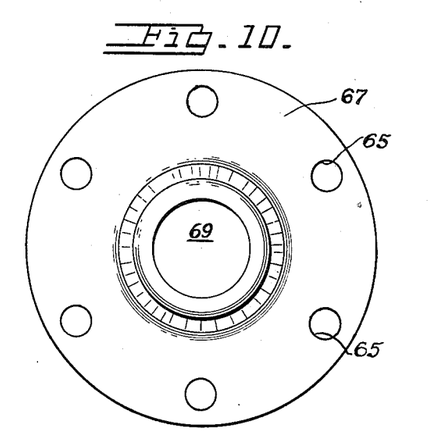
Fig. 10 is an end elevational view thereof.

As shown in Fig. 1, the fan is attached by means of screws 61 passing through the fan ring 59 into a large heavy annular flange 63 integral with the bearing sleeve 37 and projecting radially from the outer end thereof, the bearing sleeve 37 being shown in detail in Figs. 7 and 8. This flange 63 has bolt holes 64 cooperative with similar bolt holes 6 provided in the fan ring 59 and also having holes 65 in the circular or annular flange 67 of a power take-off coupler 69, as seen in Fig. 1. This power take-off coupler is seen more clearly in Figs. 9 and 10. The fan mounting screws 61 also pass through this annular flange 67 of the power take-off coupler securing both the fan and the coupler snugly to the large heavy flange 63 of the bearing sleeve 37, the latter being splined to the main shaft 39.

The outer end of the crank shaft 39 receives a large nut 71 threaded thereon and clamping a retainer washer or ring 73 of a diameter larger than the shaft so that its outer edge abuts the outer end of the bearing sleeve 37 to hold the latter firmly against axial movement on the crank shaft. The inner race ring of bearing 33 abuts the outer flange 63 of the bearing sleeve and limits end movement of the shaft. The power take-off coupler 69 is of a hollow or tubular conformation with the opening 69' in inner end large enough to fit over the large nut 71 on the end of the crank shaft. The take-off coupler projects from the end of the shaft providing an axial extension to conveniently receive any shaft 72 shown dotted, to which the engine is to be connected for supplying driving power thereto. For compactness and light weight, the outer end of the power coupler is preferably tapered to a smaller diameter, and a set screw 70 provides attachment to a driven shaft.

An annular shaped end cover 73 is provided which is centrally apertured to pass over the power take-off coupler 69 and having outer edge surface 75 conformed to interfit snugly with corresponding outward surfaces 75' on end housing 53, attachment being made by screws 76 passed through holes 76' therein. The central aperture in the fan cover 73 is made sufficiently larger than the power coupler 69 to serve as an intake port 74, other intake ports 75 being provided in the cover, to admit cooling air which is drawn into the housing by the fan. From the housing the cooling air is discharged through discharge ports 77 which are suitably located to apply the cooling air to the engine. As may be seen in Figs. 12 and 13 a plurality of these discharge ports 77 are provided at circumferentially spaced positions around the inner side of the housing and, if desired, suitable baffle or shroud means may be utilized for distributing the air uniformly or concentrated to satisfy the engine cooling requirements, as will be understood.

An oil seal at each end of the crank shaft is an important part of each such engine assembly. In each such oil seal a graphite ring 83 is provided which fits into the outer end of the annular housing neck 30 with yieldable packing O, such as an O-ring, providing a seal therebetween. The bearing retainer ring 31 is recessed to carry spring pressed pins 89 adjacent the inner side of this graphite ring, and pressing an annular compression plate 88 thereagainst. The bearing sleeve flange is provided with a raised annular sealing ring 90 running against a similar sealing ring 92 on the graphite ring.

Figure 5:
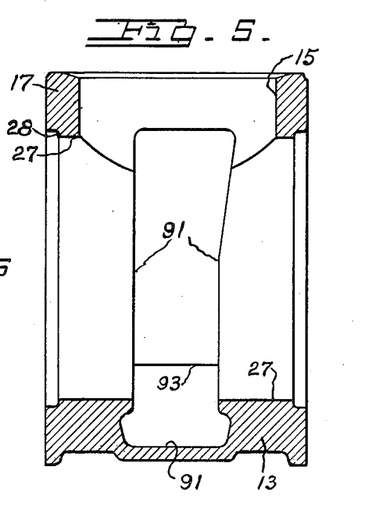
Fig. 5 is a sectional view on line 5—5 in Fig. 4, showing the same view of the crankcase as seen in Fig. 1 but clear of other elements.

As may be seen in Figs. 1, 2 and 5, the outer wall of the crank case 13 is of a substantial thickness and a deep groove 91 is provided therein to receive the outwardly projecting portions of the crank-pin bearing 47. Also, as may be seen in Fig. 2, the adjacent outer wall of the crankcase 13 is made to such a shape that its inner surfaces closely follow the paths of the outermost projecting portions, corners or screw heads, of the crank-pin bearing 47. The adjacent crankcase surface therefore follows the parallel lines generated by outer points moving with this bearing 47 as it rotates, and such lines do not follow a circular path.

By thus closely confining the outer portions of the rotating crank-pin bearing 47, its rapid motions are utilized to whip up the heavy fuel fractions and oil residues which usually settle to the bottom of the crankcase.

As Figs. 2, 4, 5 and 6A show, the crankcase 13 is provided with an intake port 93 and an outer mounting boss 93' in the bottom thereof and slightly to one side of the center line. The bottom of the crankcase 13 is shaped to provide an inclined surface 95 sloping down toward this air intake port, and by mounting a carburetor 97 on this intake port the fuel charged air is admitted at the lowest point in the crankcase. This may be readily accomplished by providing an intake manifold 99 having its inner end attached to the intake port at the bottom of the crankcase and projecting therefrom with the carburetor mounted on the outer end so that all the air drawn in through the passage 101 in the manifold is properly charged with fuel. This charged air enters the crankcase at a low point through a reed check valve 103 which seats upon a valve plate 105 formed on the end of the manifold which fits up to the crankcase intake port, entering tangentially in the direction of rotation.

The above mentioned intake manifold, carburetor mounting bracket and valve assembly is more fully disclosed, and is claimed, in my co-pending U. S. patent application Serial No. 377,890 for "Internal Combustion Engines" executed concurrently herewith and filed concurrently herewith on September 1, 1953. The reed of this check valve is mounted at an inclined position with its vibrating or swinging end at the low point where the drainage from the crankcase settles so that such heavy fuel fractions and oil residues are agitated and stimulated to commingle intimately with the fuel charged air. In this condition it is carried along as an oily mist which would tend to settle in the crankcase and run back but by being confined in the crankcase groove 91 in close proximity to the outer surfaces of the rotating crank-pin bearing 47 this oily mist is whipped and held in suspension. The crank pin bearing 47 pushes it along and then throws it into the side port 107 where it is picked up by the flowing stream of fuel charged air and carried along in the side conduit 109 and up to the intake port 111 in the side of the cylinder. An outer mounting pad 107' is provided on the side of the crankcase.

Because the special construction of the crankcase provides and continues such intimate commingling of the oily mist with the charged air, the charge is delivered and burned effectively and a clean crankcase and smooth running engine is obtained. An exhaust port 112 is provided in the other side of the cylinder and both the intake port and the exhaust port are positioned in suitable axial positions to be controlled by the piston in a usual manner.

Although two of the end housings 53 are provided, one at each end of the crankshaft, it is usually preferable to utilize one of the housings to enclose a flywheel 113, and such a flywheel is shown on the right-hand end of the shaft in Fig. 1. Although Fig. 1 is partially broken away the structure at the right-hand side is the same as that shown at the left-hand side except for the use of this flywheel in the right-hand housing 53. The flywheel 113 is secured by the same screws 61 which also secure the annular flanges of the bearing sleeve and the power take-off coupler together as at the left-hand side of this view. The attachment screws 61 serve also to transmit the torque to and from the flywheel, the latter being centrally apertured to rest freely upon the shaft, instead of being attached to the shaft at the center, as is the usual practice with flywheels.

Figure 6:
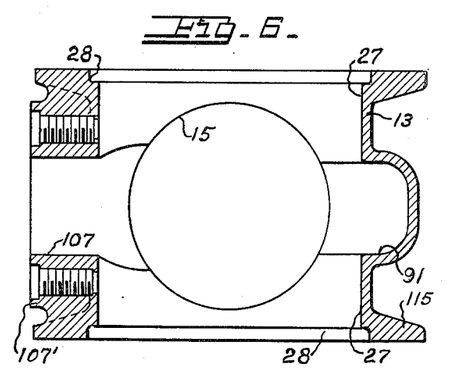
Fig. 6 is a section on line 6—6 in Fig. 4.
Figure 6A:
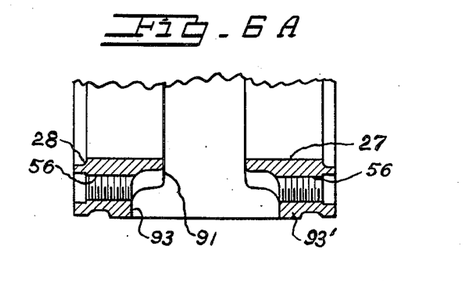
Fig. 6A is an enlarged fragmentary view on line 6A—6A.

For mounting the engine, mounting flanges 115 project from opposite sides or edges of the crankcase, as seen in Fig. 2 and more clearly in Fig. 6. Bolts may be passed therethrough for attachment of the engine to various frame or structural members where the engine is to be installed. To provide for greater adaptability in meeting different installation requirements, both of the end housings 53 are provided with oppositely exposed rectangularly shaped mounting lugs 117, as may be seen more clearly in Figs. 2, 12 and 13.

Each end housing 53 has four of these mounting lugs 117 disposed symmetrically as two opposed pairs with the two pairs in a relatively right angular relation and each lug is provided with several screw receiving apertures 119, as shown by dotted lines in Fig. 12. It will be seen that by means of these housing carried mounting lugs 117 it is possible to mount the engine between either one of two pairs of frame or structural members, spaced suitably for mounting therebetween, and in a relatively right angular relation. Also, between one pair of suitably spaced frame members it is possible to mount the engine either in a first position, or in a different position so the cylinder of the engine will be at right angles to its direction in said first position. Also it is to be noted that there are two of these housings, one at each end of the engine, and each having such mounting lugs. Accordingly it is possible to mount the other end of the engine likewise in such different positions. This is a very important advantage when installing such engines for a wide variety of useful applications such as in farm tractors, lawn mowers, washing machines, pumps and for other installations.

As Figs. 14, 15, 16, 17 and 18 show, a combination fan-flywheel is provided which may be utilized in both housings to have greater flywheel capacity, and more ample cooling, where that is desired. The combination fan flywheel comprises a wheel structure or disc 121 which has attachment apertures or bolt holes 123 and a central shaft aperture 125 for convenient mounting upon the crank shaft 39. The same screws 61 previously described are passed through the bolt holes 123 for attaching the fan flywheel to the flange of the bearing sleeve to transmit power to and from the flywheel, the central shaft aperture merely resting freely upon the shaft. The periphery of the wheel disc 121 is encircled by a massive rim 127 which provides the desired inertia of the flywheel. The wheel disc 121 is provided with a plurality of air passing apertures 129 and air scoops 131 are provided to catch the air and impel it to flow through these apertures as the wheel rotates. The air scoops 131 may be simply formed by stamping out an annular or disc-like scoop member 133 from sheet material such as sheet metal. The outside diameter of this annular disc member 133 is made suitable to fit inside of a cylindrical retainer 135 extending axially on one end of the flywheel rim 127. The air scoops may be formed from this sheet material to coincide in numbers and positions with the air passing holes 129 in the wheel disc and, as seen more clearly in Figs. 16 and 18, the scoops are shaped suitably to collect the air and throw it toward the wheel as the wheel rotates in a proper direction. After disposing the air scoop member 133 in a suitable position on the wheel, a heavy steel ring 137, of suitable resilience, is snapped into a groove 138 in the retainer extension, as more clearly shown in Fig. 16. To hold the scoop member 133 against rotation and to keep the air scoops 131 in alignment with the air passing apertures 129 in the wheel, a pilot pin 139 may be inserted into a suitable recess in the wheel disc. This pilot pin 139 has a pilot tip 141 projecting upwardly or beyond the surface of the wheel disc to enter a corresponding hole in the sheet metal scoop member, as more clearly seen in Fig. 17. The scoop member 133 holds this pilot pin in its recess in the wheel and the projecting pilot tip 141 projecting therefrom holds the scoop member from rotating away from its proper alignment with the air flows passages in the wheel. The resilient ring 137 presses on the outer edges of the scoop member 133 and holds it snug against the wheel.

By providing an annular air collecting channel or passage 143 formed in the wheel disc under the air scoops, as shown, it is not necessary to have the air scoops aligned with the air holes in the wheel. In this arrangement, the air passing holes 129 open through the wheel disc from the bottom of the annular air channel. The air is first collected into this annular passage and then flows through the wheel and the air scoops in the air scoop member do not need to coincide with the holes in the wheel either as to numbers or as to position of installation on the wheel. Manufacture, assembly and maintenance are simplified in this arrangement.

The combined fan flywheel is mounted upon the outer end of the engine crank shaft, at either end, and is secured thereon by the same bolts 61 in a manner similar to mounting the fan or the flywheel, as previously described. The fan flywheel may be mounted flush against the flange 63 of the bearing sleeve, the flange 67 of the power take-off coupler being then applied on the outside, the bolts 61 serving to clamp all three snugly together. As the central aperture of the fan flywheel merely rests freely upon the crank shaft, the power is transmitted to and from this fan flywheel by the attachment bolts 61. The combined fan flywheel may be mounted in the housing 53 at either side of the engine or two of the fan flywheels may be utilized, one in each housing, to provide greater flywheel effect along with ample cooling for the engine.

Figure 19:
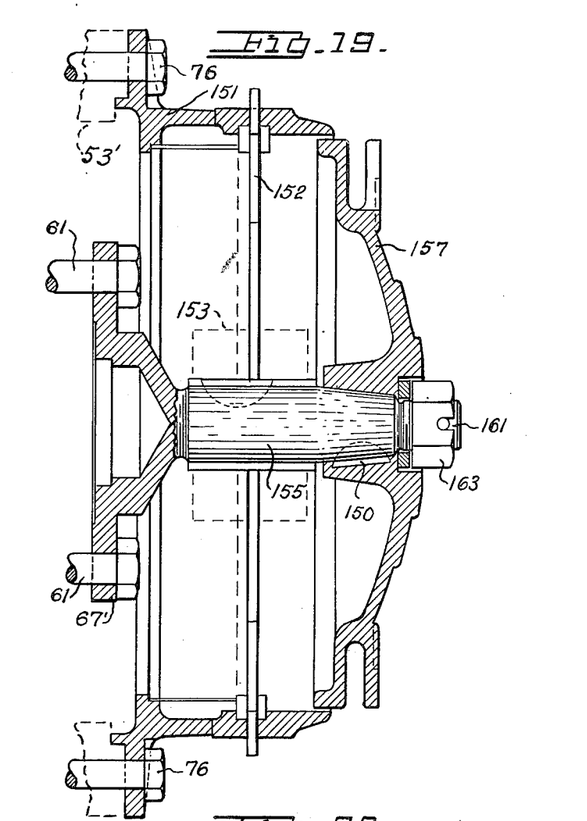
Fig. 19 is a view showing an end shaft mounting arrangement.
Figure 20:
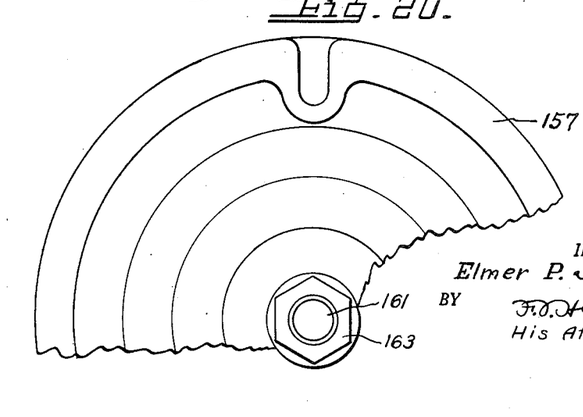
Fig. 20 is an outer end elevational view thereof.

Fig. 19 shows an end shaft mounting which is readily utilized on either end of the crank shaft. Mounting consists merely in removing the fan cover, or omitting it, and utilizing the same bolts 76 in the outer rim of the end housing for securing a stationary member or structure 151 thereon, which may be any device to be supported cooperatively with some rotary part to be carried upon and driven by the shaft. For example, the stationary member 151 may be a support for mounting the stationary field structure 152 of a well known type of magneto which comprises a coil and also the shoes of the field for making close engagement with a rotary magnet 153. To support and drive the rotor 153 of such a magneto a solid end shaft coupler 155 is bolted to the end of the crank shaft by the same bolts 61 mentioned above, similarly to the coupler previously described but of a shape suitable for this purpose. When reversing the engine rotation, it is then only necessary to change the cam of such a rotor.

As Fig. 19 shows, such a solid shaft coupler 155 is also useful for mounting a cable starting sheave 157 held non-rotatively relative to the coupler by a key 150 interlocking cooperatively therebetween. The solid shaft end coupler 155 has a threaded end portion 161 of a reduced diameter, for receiving a nut 163 thereon to clamp the starter cable sheave 157 snugly upon the end of this coupler. By the use of a cable (not shown) such a sheave may be utilized for conveniently starting the engine in a well known manner.

It will be understood that the improved features of this engine may also be advantageously utilized in internal combustion engines cooled by other heat dispersing mediums besides air, except for those features of this engine which relate directly to the delivery of air as a cooling medium.

A spark plug 159 is mounted through the cylinder head for igniting the compressed charge in the combustion chamber and suitable high tension electrical impulses may be supplied thereto, in properly timed relation, from any conventional magneto or ignition system. Starting of the engine is accomplished by giving it an initial rotation in a usual manner.

It is apparent that within the scope of the invention modifications and different arrangements may be made other than herein disclosed, and the present disclosure is illustrative merely, the invention comprehending variations thereof.

What I claim as new and desire to secure by Letters Patent of the United States is:

1. In a crankcase assembly for an internal combustion engine the combination of, a casing enclosing a space suitable for a rotating crank shaft with a connected connecting rod and crank pin bearing, said casing being provided with a cylinder mounting aperture between two end walls each having an end aperture therein, said end apertures being in alignment with each other on an axis which passes through the enclosed space and intersects the cylinder axis, an annular flywheel end housing and an annular fan end housing each having an annular flange of smaller diameter than its respective housing projecting axially therefrom and of a size and shape fitting one of said end apertures, said housings being respectively mounted one upon each end wall of the casing with the smaller annular flange of each housing inserted into the corresponding end aperture of the casing, and attachment means securing each housing to the adjacent casing end wall.

2. A crankcase assembly for an internal combustion engine in accordance with claim 1 in which a crank shaft is disposed in said casing and aligned along the axis of said end apertures with the ends of the shaft in the annular housing flanges in the end walls of the casing, and in which bearing means rotatively supporting the ends of said shaft is mounted in said annular housing flanges.

References Cited in the file of this patent

UNITED STATES PATENTS

| | | |
|---|---|---|
| Re. 21,886 | Johnson | Aug. 26, 1941 |
| 1,423,365 | Smith | July 18, 1922 |
| 1,465,165 | Hall-Bullock | Aug. 14, 1923 |
| 1,622,015 | Williams | Mar. 22, 1927 |
| 1,669,951 | Stitt | May 15, 1928 |
| 1,693,073 | Donath | Nov. 27, 1928 |
| 1,812,060 | Rayfield | June 30, 1931 |
| 2,140,687 | Brown | Dec. 20, 1938 |
| 2,256,601 | West | Sept. 23, 1941 |
| 2,334,185 | Fisk | Nov. 16, 1943 |
| 2,394,675 | Fawick | Feb. 12, 1946 |
| 2,513,563 | Ikert | July 4, 1950 |
| 2,603,201 | Kiekhaefer | July 15, 1952 |
| 2,627,255 | Kiekhaefer | Feb. 3, 1953 |